United States Patent [19]
Edelmann et al.
[11] Patent Number: 4,775,246
[45] Date of Patent: Oct. 4, 1988

[54] SYSTEM FOR DETECTING UNACCOUNTED FOR PRINTING IN A VALUE PRINTING SYSTEM

[75] Inventors: George B. Edelmann, Wilton, Conn.; Kevin D. Hunter, Redbank, N.J.; Arno Muller, Westport; Alfred C. Schmidt, Jr., Wilton, both of Conn.

[73] Assignee: Pitney Bowes Inc., Stamford, Conn.

[21] Appl. No.: 832,904

[22] Filed: Feb. 25, 1986

Related U.S. Application Data

[63] Continuation-in-part of Ser. No. 724,372, Apr. 17, 1985.

[51] Int. Cl.[4] .................. H04L 9/02

[52] U.S. Cl. .................. 380/23; 380/25; 380/51

[58] Field of Search .................. 380/23, 25, 51; 364/464, 900; 340/825.34; 101/91

[56] References Cited

U.S. PATENT DOCUMENTS

| | | | |
|---|---|---|---|
| 3,702,464 | 11/1972 | Castrucci | 340/173 SP |
| 3,890,599 | 6/1975 | Simjian | 340/149 R |
| 3,990,558 | 11/1976 | Ehrat | 194/4 R |
| 4,097,923 | 6/1983 | Eckert et al. | 364/900 |
| 4,218,011 | 8/1980 | Simjian | 235/375 |
| 4,222,518 | 9/1980 | Simjian | 235/375 |
| 4,226,360 | 10/1980 | Simjian | 235/375 |
| 4,249,071 | 2/1981 | Simjian | 235/375 |
| 4,253,158 | 2/1981 | McFiggans | 380/23 |
| 4,258,252 | 3/1981 | Simjian | 235/432 |
| 4,268,817 | 5/1981 | Simjian | 340/147 A |
| 4,285,050 | 8/1981 | Muller | 346/900 |
| 4,317,028 | 2/1982 | Simjian | 235/380 |
| 4,422,148 | 12/1983 | Soderberg et al. | 364/464 |
| 4,436,992 | 3/1984 | Simjian | 235/381 |
| 4,458,109 | 7/1984 | Mueller-Schloer | 178/22.11 |
| 4,637,051 | 1/1987 | Clark | 380/51 |
| 4,641,346 | 2/1987 | Clark et al. | 380/51 |
| 4,660,221 | 4/1987 | Dlugos | 380/51 |

FOREIGN PATENT DOCUMENTS

| | | | |
|---|---|---|---|
| 1121014 | 3/1982 | Canada | 380/25 |
| 2032224 | 4/1980 | United Kingdom . | |
| 2066736A | 7/1981 | United Kingdom | 380/25 |
| 2097330 | 11/1982 | United Kingdom . | |
| 2102606 | 2/1983 | United Kingdom . | |

Primary Examiner—Salvatore Cangialosi
Attorney, Agent, or Firm—Peter Vrahotes; Melvin J. Scolnick; David E. Pitchenik

[57] ABSTRACT

A system for detecting fraudulent imprints on documents is disclosed. The system comprises a metering device, a host and a verifying facility. The metering device provides a validation signal to the host and its associated printer. Thereafter, the printer prints information which includes information from the validation signal. Thereafter the information printed on a mailpiece can be validated at the verifying facility by detecting the validation information provided by the metering device. The system provides a method to make a secure metering device without an integral printer. This value printing system provides for a secure system that will allow for the detection of fraudulent imprints at a verifying facility.

27 Claims, 9 Drawing Sheets

SYSTEM FOR DETECTING UNACCOUNTED FOR PRINTING IN A VALUE PRINTING SYSTEM

RELATED APPLICATIONS

This application is a continuation in part of U.S. patent application Ser. No. 724,372 filed Apr. 17, 1985, for George B. Edelmann and Arno Muller and entitled SYSTEM FOR DETECTING UNACCOUNTED FOR PRINTING IN A VALUE PRINTING SYSTEM.

FIELD OF THE INVENTION

This invention relates to value printing systems and, in particular, it relates to a system wherein the metering device is completely separated from the printer when printing documents for value. For example, typically the metering device is connected to a printer in which the postage imprint contains information in the meter accounting registers. Many meter accounting functions may be beneficially incorporated in a device which may be removably connected with portions of the mailing system and which device may include a processor to provide data processing capability.

BACKGROUND OF THE INVENTION

A postage meter typically includes a printer to imprint postal information on a mail piece. Postage meters of this type are described in a U.S. patent issued to Alton B. Eckert, Jr., Howel A. Jones, Jr. and Frank T. Check, Jr., entitled "A Remote Postage Meter Charging System Using an Advanced Micro-Computerized Postage Meter" issued on June 27, 1978, U.S. Pat. No. 4,097,923. Another example of a meter that utilizes a printer is described in a U.S. Pat. No. 4,422,148 issued to John H. Soderberg and Alton B. Eckert, Jr. and Rober B. McFiggans entitled "Electronic Postage Meter Having Plural Computing Systems" issued on Dec. 20, 1983.

Postal meters of the above-described form may be provided with several modifications. For example, in one modification, a remote charging feature is available whereby the key is provided for operation of the three position charging switch on the keyboard. The operator of the unit may thus be provided with suitable combinations for entry into the keyboard to enable remote charging. In a further modification the three position charging switch on the keyboard may be controlled by a simple knob without the necessity of the key. In this type of system, the meter may be manually recharged at the post office, but the service function may be effected locally in a manner similar to that of the remote charging system type units.

The postage meters described above all contain printers that are an integral part of the meter itself. Although these meters as described above serve their intended purpose in an exemplary fashion it is always important to develop new and improved postage metering devices to decrease cost and improve efficiency.

As is well known, in a typical system the postage meter will contain the printing apparatus to facilitate applying postage to a mail piece or the like. The printing apparatus located within the postage meter adds to the cost and the complexity of the meter.

Typically, in an electronic postal mailing system it is important that the postal funds within the meter are secure. What is meant by the funds being secure is that when the printer prints postage indicia on a mail piece, the accounting register within the postage meter always should reflect that the printing has occurred. In typical postal mailing systems, since the meter and the printer are integral units, both are interlocked in such a manner as to ensure that the printing of a postage indicia cannot occur without accounting. Postal authorities generally require the accounting information to be stored within the postage meter and to be held there in a secure manner, thus any improved postal mailing system should include security features to prevent unauthorized and unaccounted for changes in the amounts of postal funds held in the meter. Postal authorities also require that meters be put in service and removed from service in strict compliance with their requirements for registration and periodic (for example, every 6 months, inspection. This enables the Post Office to keep records on the usage of a meter and detect fraud. Thus, there are also administrative costs associated with the record keeping, inspection and servicing of meters.

There is a continuing need for less expensive and more efficient postage meters. As before-mentioned, typically a postage meter has associated with it different peripherals that add to the cost thereof. It is important to develop postage meters that can be adaptable to postal mailing systems which are cheaper and more efficient, but will also be able to maintain the high level of security associated with the above-mentioned postage meters. It is also important that any new postal mailing system developed be one in which security can be maintained in a manner in keeping with the previously mentioned mailing systems. Thus, what is described is a secure postal mailing system with an improved postage meter that can be adaptable to different types of peripheral equipment.

SUMMARY OF THE INVENTION

In an illustrative embodiment, an electronic postal mailing system is disclosed which includes an electronic postage meter which comprises an accounting unit only. The accounting unit comprises a processing unit, in this embodiment a microcomputer, a non-volatile memory (NVM) and an encryption unit connected to the microcomputer.

The accounting unit provides a capability of generating an encrypted validation number for printing on a document. This generated validation number provides a method for detection of unaccounted printing and supplies the postal authorities with information on the meter accounting registers. The printer in this embodiment would be located within the mailing machine or some other host which would also be a part of the mailing system.

The host or mailing machine of this embodiment comprises principally a second microcomputer, and a printer. The meter is able to communicate with the mailing machine or host to perform all the accounting functions, to accept funds, reset to zero for removal from service and any other actions that electronic postal mailing systems generally perform. In addition, it is advantageous in this meter to use techniques such as a mechanically secure enclosure and electronmagnetic shielding, isolating power supply and isolating communication links which are used in existing meters.

The electronic postage meter of this embodiment, as before-mentioned, does not print postage but supplies an electronic signal which will represent an encrypted validation number for the postage amount that it accounts for. In this embodiment the encrypted validation number is to be printed along with a dollar amount, the meter number and the date of issue. The number is typically printed in a system approved format that would be appropriate for automatic detection if required. This encrypted validation number is used to detect illegal printing of a dollar amount that has not been accounted for.

In this illustrative embodiment the mailing machine's processing unit would receive a dollar amount from a keyboard or the like and would send that information to the processing unit of the meter. The meter's encryption unit would thereafter generate an encrypted validation number using the key and plain text supplied by the processing unit of the meter. The plain text would be the postage information and meter accounting registers of the meter. It should be recognized that other information such as date, origin of the document, destination, etc., can also be used depending on the need and desires of the user. The key would be internally stored within the NVM.

The meter would then send the validation number along with the meter serial number to the processing unit of the mailing machine or host. The processing unit within the host thereafter sends the postage information, meter serial number and validation number to a printer. The printer, in turn, imprints the postage information, date, meter serial number and validation number on a mailpiece or document. The validation number on the document would be decrypted by a unit at a postal facility which would provide the verifying information.

Verifying the validity of the imprint would be accomplished in the following manner. A third processing unit located typically within a postal facility will read the postage imprint data from the document. Thereafter the validation number on the document is decrypted and will be compared with the postal information on the document and optionally from previously processed documents to check for proper use of the validation number to avoid, for example, copying of valid validation numbers from previous documents. If the information decrypted is the same as the unencrypted information on the document, then the document is to be considered a valid document. If the information decrypted is different, the document is invalid. The validation number would also include accounting unit register information to provide the connection between the printed dollar amount and the meter's accounting unit and to maintain records of the meter's usage in the postal facility. This makes it possible for the postal authorities to maintain records much more easily and accurately than is possible at the present time. It may be speculated that, in a completely automated system with online computerized record keeping, postal records could come very close to tracking the meters accounting registers. The validation number, as well as other information on the document, can be in machine readable format. This includes, for example, special alpha numeric fonts, various forms for coding, magnetic printing techniques, or other suitable means. This facilitates automation of the document processing including activities such as sorting, spot verification and processing of the validation number. The requirement of special machine readable techniques requires access to information regarding the encoding techniques and access to equipment which may not be readily available to the general public.

The task of the postal authorities to guard against fraud would be made much easier, and the need for inspections would be greatly reduced.

Thus, in this illustrative embodiment a microcomputer within the meter would be in communication with a microcomputer within a mailing machine or some other type of host unit. In this system, the postage meter would supply an electronic signal which represents an encrypted validation number to the mailing machine. After receiving the appropriate signal from the postage meter, the mailing machine would signal its printer to print the desired postage amount. The post office would then be in a position to verify that the postmark imprinted by the mailing system was a legitimate one or not and maintain quite accurate records on the usage of the meter by getting a new reading of the meter accounting registers from each postmark.

Thus, in this environment, the mailing system prints the postage amount and the encrypted validation number which a post office or other agency could use to validate the postage imprint. The postage meter of this embodiment contains no printer thereby making it less complex and less expensive. In addition, a postage meter of this type could be adapted to a wide variety of mailing machines or other peripheral units. The encryption scheme utilized to protect the validity of the postage imprint can be any of a variety of schemes known to those skilled in the art including, for example, those that have been used typically to protect the accounting information located within the meter.

Therefore, this system provides for a cheaper and simpler postage meter which could be adapted to a wide variety of mailing machines. This system also allows for a postage meter which is completely separated from the printing function in which only an electrical signal is supplied to a peripheral device, i.e., a mailing machine with a printer, which represents a validation number. This system also makes it much easier for the post office or other agency to detect fraud by making it possible to keep more accurate and up-to-date records on usage of each meter.

A BRIEF DESCRIPTION OF THE DRAWINGS

The above-mentioned and other features of the invention will become better understood with reference to the following detailed descriptions when taken in conjunction with the accompanying drawing, wherein like reference numerals designate similar elements in the various figures, and in which.

DETAILED DESCRIPTION

The invention is disclosed in the context of a postage meter, however, other types of meters may have the invention applied thereto with equal success and these include parcel service meters, tax stamp meters, check writing meters, ticket imprinters, and other similar devices.

Figure 1:
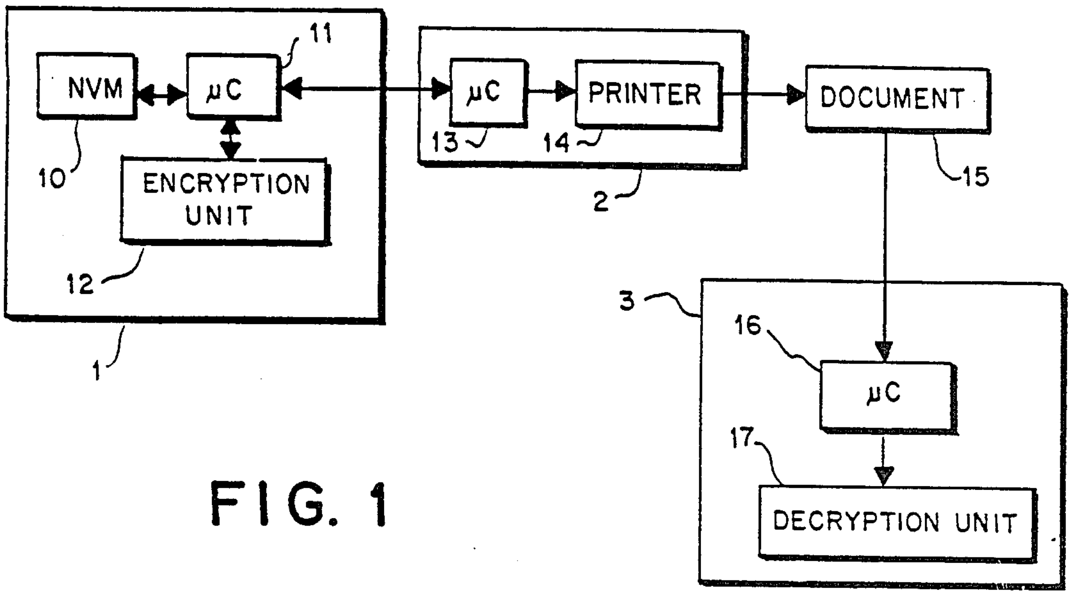
FIG. 1 is a block diagram of the electronic postal mailing system.

FIG. 1 shows in block diagram form a mailing system according to our invention. The mailing system of this invention comprises of the meter 1, which is in communication with the host 2. The host 2, typically, is a mailing machine but can also be a variety of other devices which could communicate with the meter. The host 2, in turn, imprints a postage amount along with other information on a document 15. The document is then read at a verifying facility 3, that facility typically being a postal facility. At that facility 3, the decryption of the document's validation number is accomplished and the document is then validated.

The meter 1 comprises in this embodiment a processing unit or microcomputer 11 which is coupled to a non-volatile memory 10 and is also coupled to an encryption unit 12. The processor unit, for example, can be a microprocessor, a microcontroller, microcomputer, or other intelligent device which provides processing capability, hereinafter referred to as either a processor, microcomputer or microprocessor. The meter of this embodiment does not have a printer associated therewith and provides electronic signals which represent the validation number and postage meter serial number to the host.

As can be also seen, the host 2 comprises a second processing unit or microcomputer 13 and may include a printer 14. The printer may also be a separate unit. The microcomputer 13 provides intelligence to allow for the communication back and forth to microcomputer 11 of the meter and to the printer 14 to initiate printing when the proper information is given thereto.

Typically, a keyboard or the like (not shown) sends the information representing the postage amount to microcomputer 13. Thereafter, the microcomputer 13 sends a signal to microcomputer 11 consisting of the postage amount to obtain a validation number for printing.

The encryption unit 12 after receiving a signal from microcomputer 11 will provide the microcomputer 11 with a validation number. This validation number is typically computed with a key within the encryption unit 12. The key is provided, by way of example, by combining the serial number of the postage meter and a secret constant stored in the ROM of the microcomputer 11.

The validation number will thereafter be transmitted to the microcomputer 13 of the host 2 to initiate the printing process. The printer, as before-mentioned, in turn will print on the document 15 the information communicated from the microcomputer 13. Thus, the meter provides to the host 2 the meter serial number and the validation number to be printed on document 15. The host 2, as before-mentioned provides the postage amount. In this embodiment, either the host 2 or the meter 1 can provide the city, state and date information. As will be apparent later, date information may be included in the encrypted validation number. The meter number, date and validation number on the document 15 is communicated to facility 3 where the validation number will be decrypted to enable verification of postage amount, date and accounting information.

Figure 2:
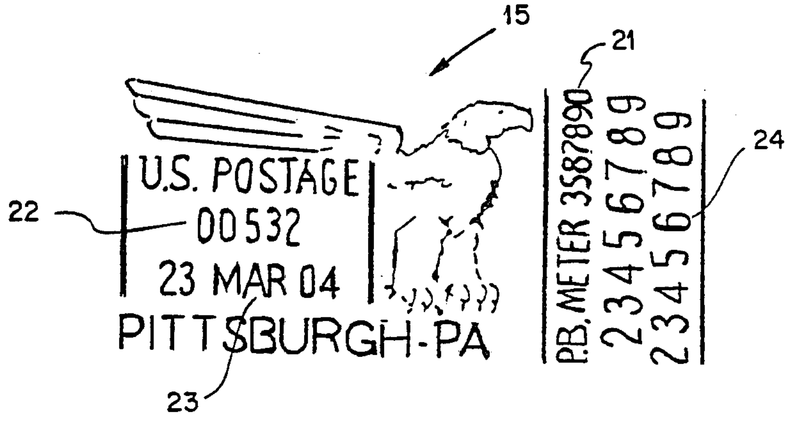
FIG. 2 is a perspective view of a document in which the printer has imprinted the postal information thereon.

Referring now to FIG. 2, the document 15 will have a dollar amount 22, the date 23 and the meter serial number 21. In addition, the document will include a validation number 24.

Figure 3:
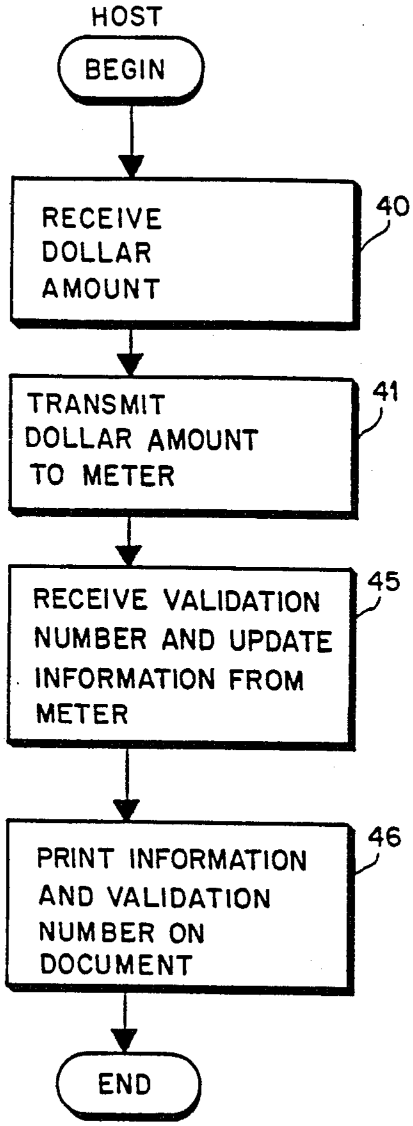
FIG. 3 is a flow chart of the operation of the host of the electronic mailing system of FIG. 1.
Figure 4:
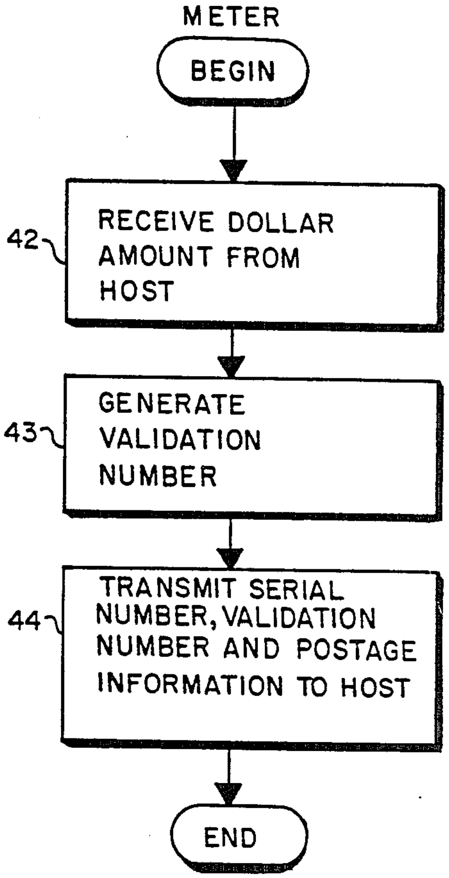
FIG. 4 is a flow chart of the operation of the meter of the mailing system of FIG. 1.
Figure 5:
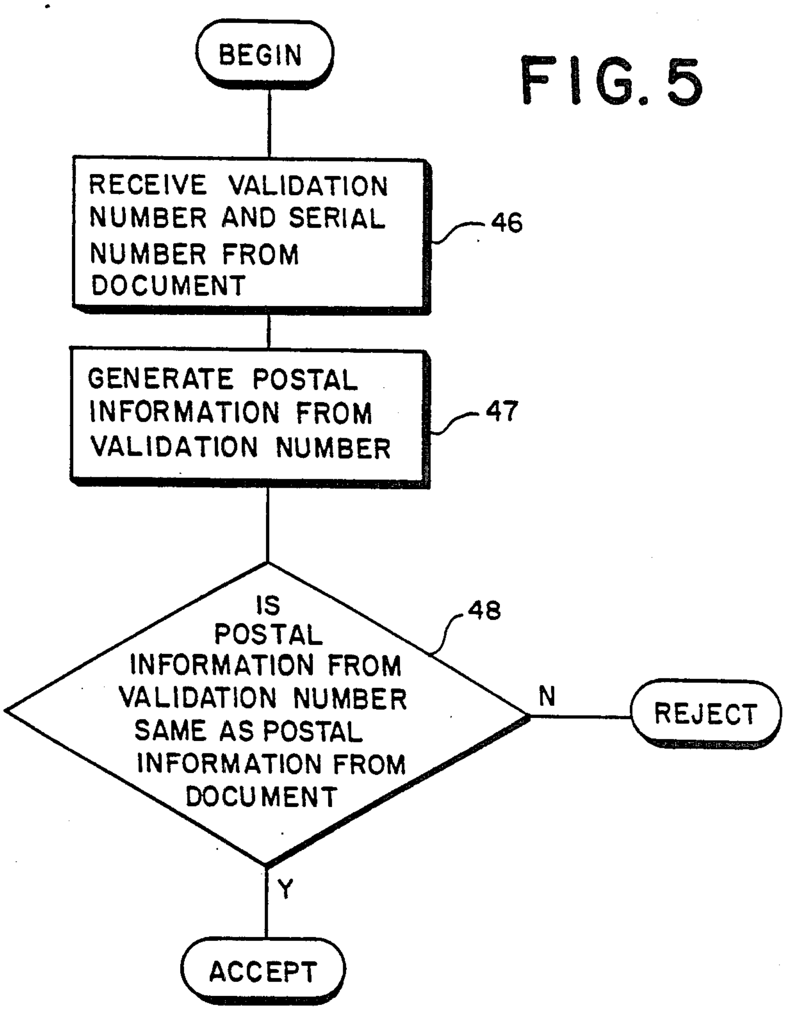
FIG. 5 is a flow chart of the operation of the verifying facility of the mailing system of FIG. 1.

FIGS. 3, 4 and 5 are flow charts describing the operation of the postal mailing system, in particular describing the method for verifying the integrity of the document. Referring to FIGS. 3 and 4, initially the host 2 (FIG. 1) will receive a dollar amount from a source, whether that be an operator or some other source, indicated by box 40. Thereafter, the dollar amount is transmitted to the meter 1 (FIG. 1), box 41. Referring to FIG. 4, the meter will receive that dollar amount from the host 2, box 42 and will thereafter generate a validation number, box 43. After generating that validation number, the meter 1 will thereafter transmit the serial number and the validation number which includes postal information back to the host 2, box 44. Referring back to FIG. 3, the host 2 (FIG. 1) will then receive that meter serial number and validation number from the meter, box 45. Thereafter the printer 14 (FIG. 1) will print on the document the postage information, that is the dollar amount, the date, the meter serial number and the printer will also print the validation number received from the meter.

The next step in the process is to validate or to verify the integrity of that document received from that host 2. This is accomplished at the verifying facility 3 (FIG. 1). As before-mentioned the facility 3 would typically be a postal office facility and there the equipment to validate or verify postage imprint would be located. Thus, referring to FIG. 5, the microcomputer 16 (FIG. 1) would receive a validation number and meter number from the document 15, box 46 by keyboard, bar code reader or the like. Thereafter, that validation number would be decrypted and postal information would be generated, box 47 in human readable form.

The postal information that is to be generated is namely the postage amount and date received from the printer 14 of the host 2, ascending register (the total amount of postage printed by the meter), and piece counter (the total number of documents metered) information. Thereafter, that information will be compared to the postal information on the document and in the post office files. If there is a match between the information on the document and the information displayed, then the post office knows that there is a valid postage imprint. If there is not a match, then the post office knows that the imprint is invalid. (See decision box 48.) Further, if the ascending register (total amount of postage accounted for by the meter), and piece counter (total number of documents metered) information shows changes which are inconsistent with the information in the Post Office files on that meter, an inspection of the meter may be undertaken to detect malfunction or tampering.

Figure 6:
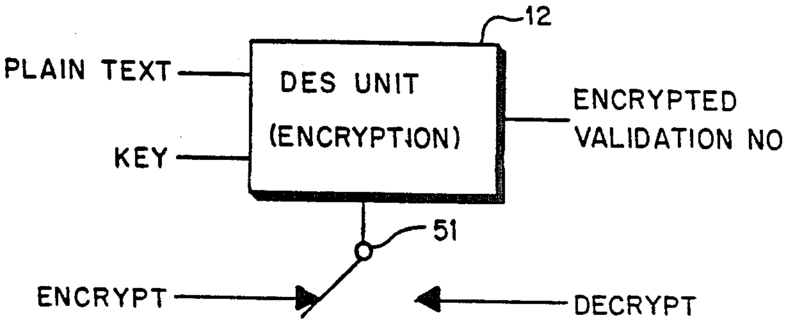
FIG. 6 is a diagram of an encryption/decryption subsystem illustrating the subsystem in the encryption mode.
Figure 7:
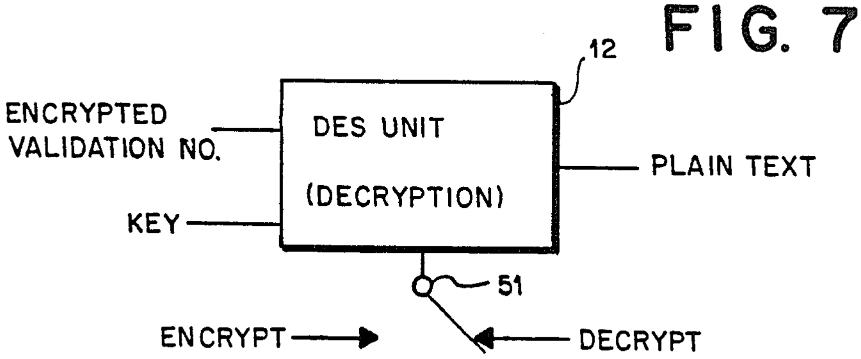
FIG. 7 is the encryption/decryption subsystem illustrating the subsystem in the decryption mode.

FIGS. 6 and 7 shows a typical encrypting/decrypting subsystem. This unit could typically conform to the Data Encryption Standard (DES) FIPS PUB 46, in which postal information, namely, the dollar amount, the date, the ascending register amount, and the piece counter content can be inputted to the unit along with a key. Encrypting data converts it to an unintelligible form called cipher. Decrypting cipher converts the data back to its original form. The algorithm described in this standard specifies both enciphering and deciphering operations which are based on a binary number called a key.

As before-mentioned, the key information is typically the serial number of the postage meter, which is printed on the document, and a secret constant. The key and postal information is thereafter combined within unit 12 to output an encrypted validation number in the encryption mode. As can be also seen in FIG. 6, switch 51 is shown moved to a position so that the postal information and the key can be entered so that the encrypted validation number is provided at the output. This type of unit can thus be utilized as the encryption unit 12 (FIG. 1) in the meter unit 1.

It is known that data can be recovered from cipher only by using exactly the same key used to encipher it. Thus, it is clear that decryption unit 17 (FIG. 7) at the postal facility is the same as the unit 12 within the meter. In systems of this type the encryption and decryption units may differ. However, other suitable encryption techniques may also be used such as public key encryption systems. Referring to FIG. 7, it can be seen that the key is obtained from the combination of meter serial number on the document and a secret constant resident in the ROM (read only memory) of the microcomputer 16. The key must be the same as the key in the encryption unit 12. The switch 51 is moved from the encrypted mode to the decrypted mode to obtain decryption. At the output thereof is the postal information which includes ascending register and piece counter information. Thus, in this system if the information obtained at the postal facility is different from the information on the document then the imprint is invalid.

It should be noted that although this invention is described in terms of a particular method of decrypting and encrypting information, it is done for illustrative purposes only. Thus, this invention could be utilized with other methods of encryption/decryption and those teachings would still be within the spirit and scope of the invention. Similarly, it should be noted that although this invention is described in terms of a particular combination of information used in the generation of the validation number, it is done for illustrative purposes only. Thus this invention could be utilized with other types and combinations of information and those teachings would still be within the spirit and scope of the invention. Similarly, it should be noted that even though microcomputers were used in the meter 11, host 2 and verifying facility 3 this invention could be used with other methods of processing the information and it would still be within the spirit and scope of Applicants' invention.

Thus, the electronic mailing system of this embodiment provides a secure system. In addition, the mailing system of this embodiment provides for a postage meter which separates the printing function from the metering function. In addition, the postal authority or the like have been given additional equipment to detect fraud, that is, an unauthorized postage imprint entering the postal facility This system can be utilized in a variety of ways. By the use of this system, a document would be clearly fraudulent when the information contained in the decrypted validation number does not agree with the printed dollar amount, date and meter number. In addition, if two or more documents come in with the same validation number, that is also positive identification of fraud, that is a copied document. Obviously, the ascending register and piece counter information obtained from the validation number would be the same for copied documents. But by keeping records of postal information obtained from documents coming from a particular meter, it becomes very easy to spot inconsistencies in the content of ascending register and piece counters, date and estimated flow of mail through that meter. In fact, this suggests that a few of the least significant digits of the piece counter are vital in the encrypted validation number. This would make even the fraudulent creation of a validation number with full knowledge of encryption algorithm and key worthless since the ascending register and piece counter cannot be arbitrarily changed without detection of the fraud. Also, a document with a date not in agreement with the calendar date, should be considered as possible fraud, because there is a possibility that the document has been copied and altered. Finally, a fraudulent document issued at the point of sale can be detected by immediately decrypting the validation number and comparing the decrypted ascending register amount or piece counter with the meter's ascending register or piece counter. Once again, if the amounts do not compare, an invalid document has been issued.

Figure 8:
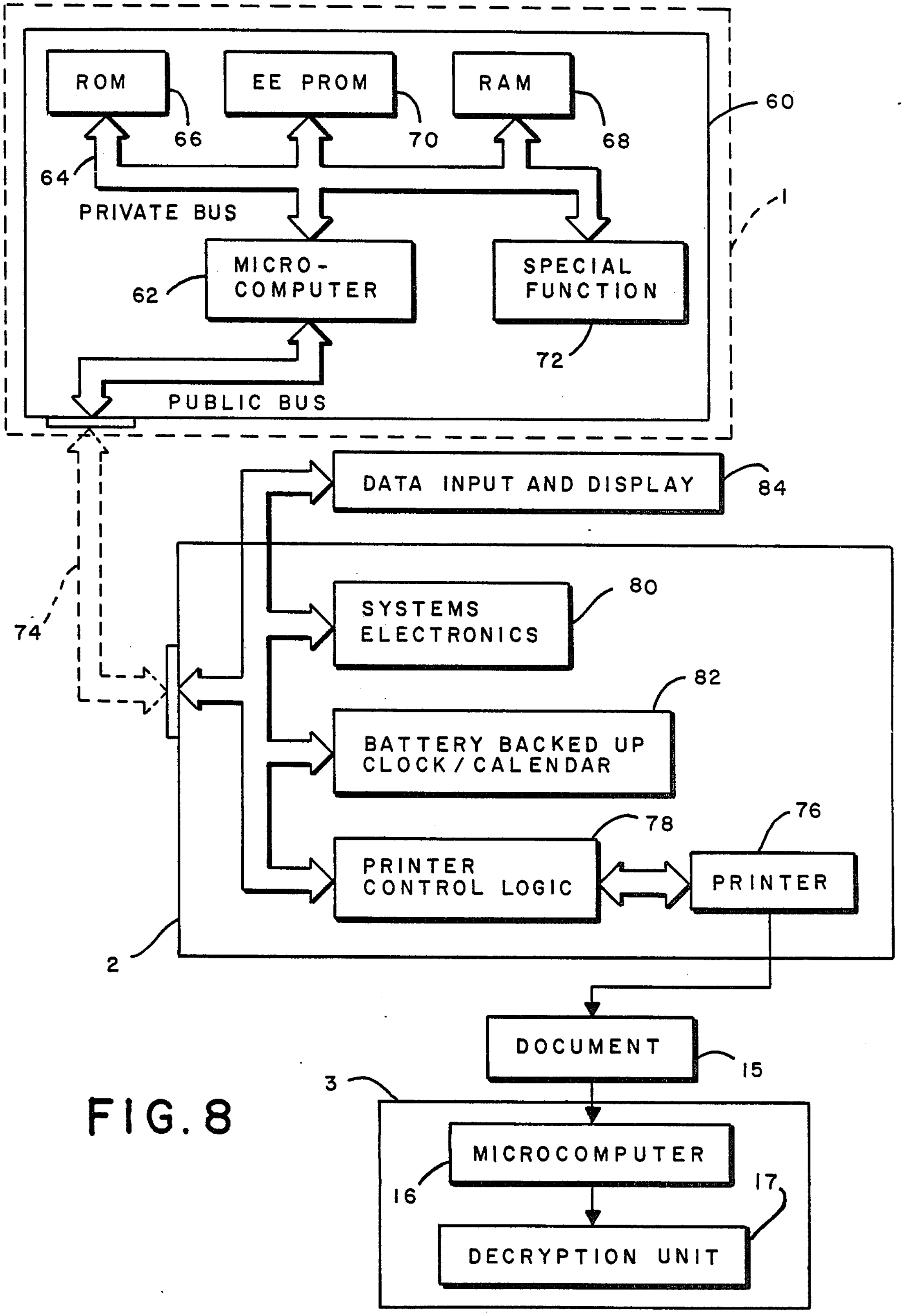
FIG. 8 is a block diagram of the electronic postal mailing system shown in FIG. 1 utilizing a removable processor device for meter accounting and control functions with the processor providing operational control for a remote unsecured printing mechanism.

Reference is now made to FIG. 8. The meter 1 includes a removable device 60. The removable device can be in the format of a "smart credit card" type structure or a larger enclosed type structure such as a cartridge or vault. The device provides physical support for and protection of a microcomputer 62 which is connected by a private bus 64 to a plurality of components. The microcomputer 62 is connected via the bus 64 to a read only memory (ROM) 66 which contains the operating program for the microcomputer 62. The program resident in the ROM 66 not only controls the operation of the microcomputer 62 but also provides the operating instructions for the microcomputer 62 to control the host device 2. In the particular embodiment disclosed and as will be explained more fully hereinafter, the host 2 contains a printer with printer logic control but does not contain a microcomputer as was the case with the system disclosed in FIG. 1.

The microcomputer 62 is also connected via the bus 64 to a random access memory 68 or other operating memory to provide dynamic storage during operation. A nonvolatile memory 70 such as an electrically erasable program read only memory (EEPROM) provides a nonvolatile storage for critical postage accounting data. Critical accounting data often includes the descending register value, the ascending register value, and the piece count value. Any accounting or other data desired to be retained during power failure such as service experience can also be filed in nonvolatile memory 70. The nonvolatile memory may also contain the serial number of the meter as well as various configuration data so that the meter 1 is operable in various countries which have different requirements and in various meter systems which have different configurations.

It should be recognized that the meter 1 is powered by an external source of power, not shown, which during normal operation provides the power to energize the microcomputer as well as the various components of the meter 1 including the ROM 66, RAM 68 nonvolatile memory 70, as well as any other special function components 72 which may be connected via the bus 64 to the microcomputer 62. Power sensing circuitry, not shown, as for example, such as is disclosed in U.S. Pat. No. 4,285,050 for ELECTRONIC POSTAGE METER OPERATING VOLTAGE VARIATION SENSING SYSTEM, can sense the presence of falling power and cause the microcomputer 62 to invoke a power down subroutine stored in the read only memory 66 to complete operations in progress and store accounting data into the nonvolatile memory 70. It should be recognized that the special function device 72 can include devices such as those associated with unique encryption techniques or printer control functions.

In contrast to the private bus 64 which is not accessible through any user or equipment external to the device 60 except by way of the microcomputer 62, and its associated control program contained in the ROM 66 on the private bus 64, a public bus 74 is provided to connect the meter 1 to the host 2. It should be recognized that other devices peripheral to the meter can be connected to the public bus such as additional printers, displays, communications devices and the like. Public bus 74 is a general purpose bus to allow communications between the meter 1 and the components within the device 60 with non-secure equipment which may be connected in the system.

With specific reference to the host 2, it should be specifically recognized that the printer 76 may be utilized for printing other than postage. The printer can be part of a personal computer, word processor, general printer or any other non-secure type printing device. The printing device 76 is operated through a printer control logic 78 which is connected through the public bus 74 to the microcomputer 62. The operating program for the printer 76 and printer control logic 78 may be stored in the read only memory (ROM) 66. Alternatively, the program for controlling the printer 76 and the printer control logic can be stored in the systems electronics 80 which would provide the operating program utilized by microcomputer 62. It should be recognized that portions of the operating program can be partitioned between read only memory stored in the systems electronics 80 and the device ROM 66 depending upon the various needs and desires of the users. A battery backed up clock and date calendar 82 is provided and connected to the public bus 74. The clock and date calender provides the ability for the printer 76 to indicate during the course of printing the day, date and time that the postage or other printing has occurred. Depending on the level of security desired, the clock and date calendar could instead be incorporated in the meter 1 or the device 60 and used, as noted above, as input data when generating the validation number. If clock and date calendars are provided in both the meter and the host, a further level of cross check can be provided on the operation of the system by comparing the values of the two clock and date calendars to verify they are the same. A data input and display module 84 may also be connected to the host 2. The data input can be a keyboard or other suitable input to enable a user to input information into the system or to control the system such as to run local diagnostics.

Figure 9:
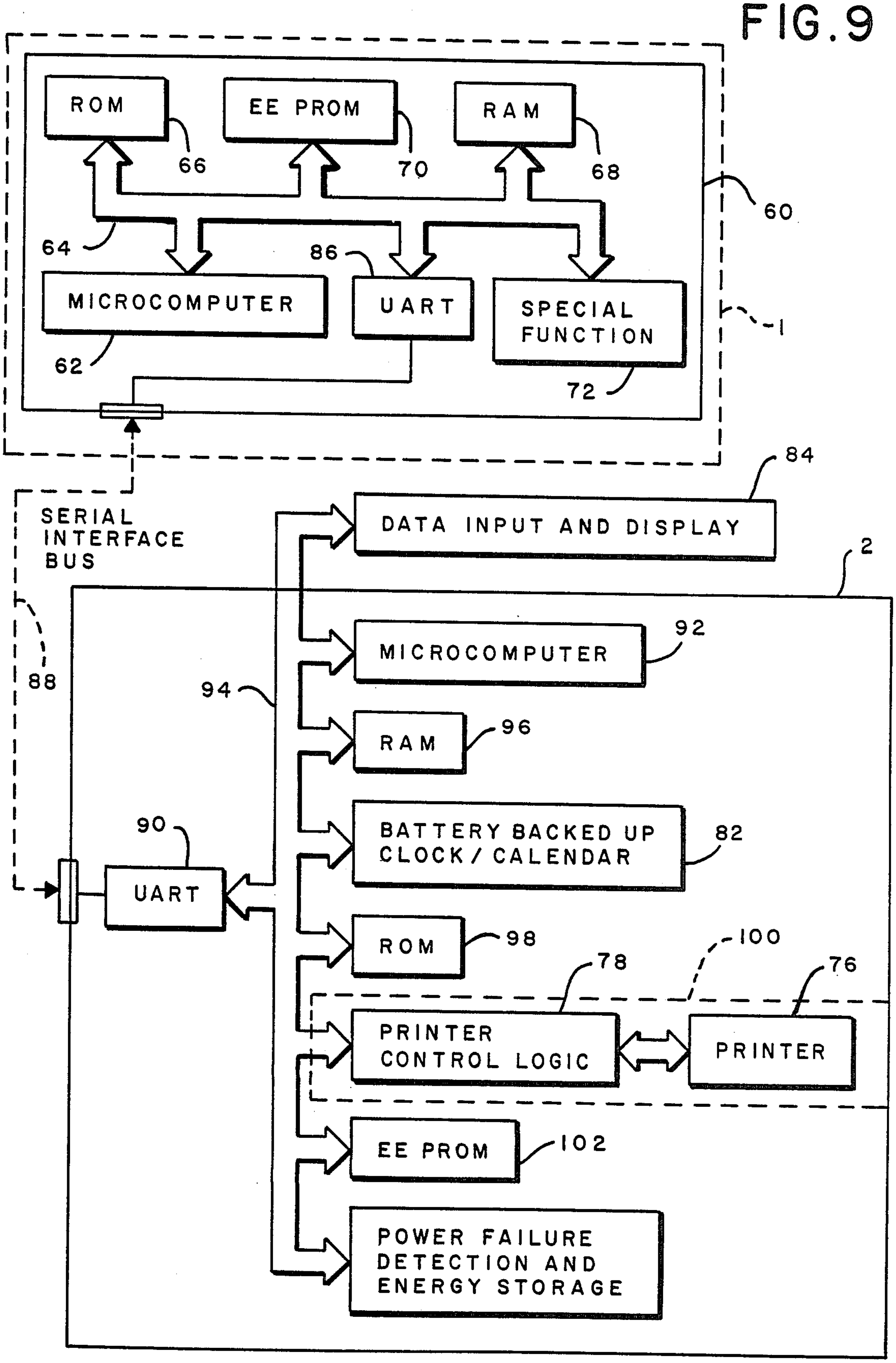
FIG. 9 is an alternate embodiment of the mailing system shown in FIG. 8 employing a printer having a processor which interacts with the processor of the removable device via a transactional interface.

Reference is now made to FIG. 9. The meter 1 includes a universal asynchronous receiver transmitter (UART) 86, or other suitable device, directly connected on one side to the private bus 64. The UART 86 is connected through a public channel 88 to a UART 90 associated with the host 2. The UART 86 buffers and precludes unauthorized access to the private bus 64 by any user or equipment external to the device 60. It should be expressly recognized that the embodiment shown in FIG. 9 employing UARTs 86 and 90 with a public channel 88 is merely but one example of numerous communication techniques between the meter 1 and the host 2. For example, parallel interfaces, local area networks, modems, telephone lines and the like can be employed as part of the communications between the two modules. It should be recognized that in the system disclosed in FIG. 8, the microcomputer 62 provides the buffering and isolation between the private bus and the public bus 74.

The host 2 includes a microcomputer 92 to control the functions of the printer control logic 78 and the printer 76. The microcomputer 92 is connected by means of a bus 94 to random access memory 96 which provides dynamic storage for data during operation of the system. Additionally, the battery backed up clock and date calendar 82 and a read only memory (ROM) 98 are also connected to the host bus 94.

The program stored in the ROM 98 provides the operating program and data tables, such as mailing rates and information regarding the printer characteristics. It should be recognized that the printer 76 and printer control logic 78 are diagramatically shown in a removable housing 100 such that various types of printers can be connected to the host 2. Specifically it should be noted that the connection can be by way of cable and that physical interconnection as part of a single unit is not necessary. Thus, by storing suitable information in the ROM 98 various printers from a group of printers operable with the system can be utilized. A nonvolatile memory 102 is connected by the bus 94 to the microcomputer 92. The nonvolatile memory 102 such as an electrically erasable programmable read only memory (EEPROM), store transaction logs and other audit trail data when power is removed from the system.

The transaction log and the audit trail may be stored in both the nonvolatile memory 102 which is part of the non-secured host 2 and additionally in the secure nonvolatile memory 70. The data stored in the nonvolatile memory 102 provides user available information regarding the various transactions and an audit trail of postage and other use of the printer or host. Examples of transactional log information are number of pieces printed, the amount of postage consumed, date of printing postage, user account identification numbers, department account identification numbers and other like data. Examples of the audit trail data are the serial number of the meter, time the meter was turned on, time the meter was turned off, value of the meter ascending and descending registers at the commencement and conclusion of operation and other suitable data to allow a reconstruction and audit of the operation and to provide a level of security to the user against unauthorized operation or accidental loss of funds. It should be recognized that the transaction log data and the audit trail data (some of which can constitute the same information) may be encrypted to provide security against unauthorized access and tampering.

Figure 10:
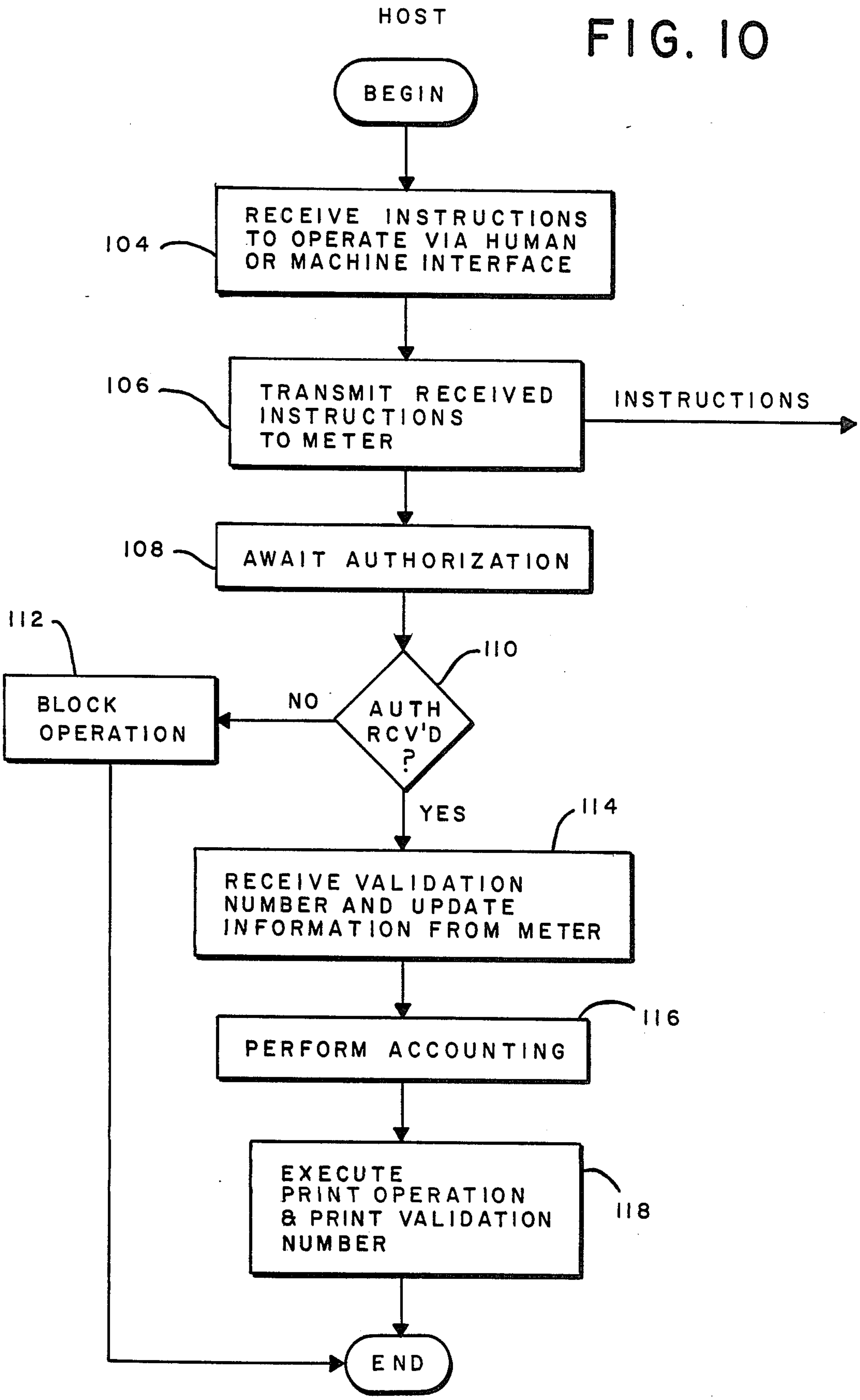
FIGS. 10 and 11 are flow charts showing the operation of the mailing system shown in FIG. 9.

Reference is now made to FIG. 10 which is a flow chart of the operation of the host 2 in the system shown in FIG. 9. The host 2 receives an instruction to operate via human or machine interface, box 104. The host thereafter transmits received instructions to the meter, box 106 and then awaits authorization from the meter, box 108.

If authorization is received the program continues its operation, decision box 110. If no authorization is received or more than a predetermined delay occurs or a signal indicating a lack of funds or other negative authorization, then no validation number is received by the host 2 and the program proceeds to inhibit operation of the printer, block 112

If proper authorization is received the host receives validation number and update information from the meter, block 114. The host thereafter performs "accounting" by updating the transactional log data and audit trail log data, block 116, and executes a print operation, block 118.

Figure 11:
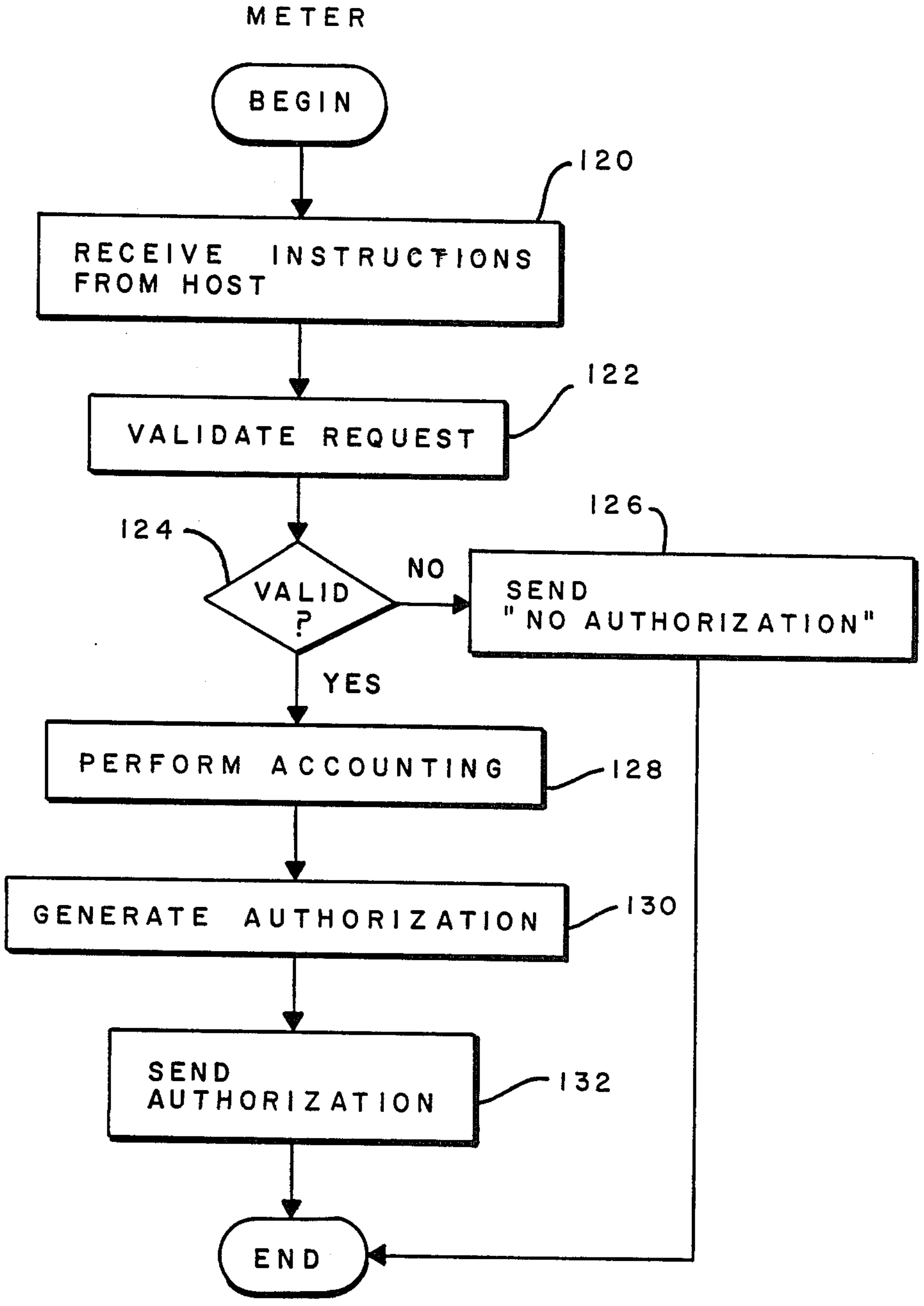

Reference is now made to FIG. 11 which is a flow chart of the operation of the meter 1 in the system shown in FIG. 9. The meter 1 operates in parallel with the operation of the host 2. The meter 1 receives instructions from the host, block 120, as transmitted during the block 106 shown in FIG. 10. The meter thereafter validates the request from the host, block 122. This will include checking for an appropriate amount of funds available for printing postage and other data depending upon the particular design of the system such as printer configuration, user identification and the like. If the request is found to be valid, the program continues operation, decision block 124. If the request is found not to be valid, the meter sends a negative authorization, to the host block 126. Where the request was found to be valid, the meter performs the necessary accounting such as decrementing the descending register and incrementing the ascending register, modifying the piece count register, block 128. The meter thereafter generates the authorization to validate the postage to be printed, block 136, and the meter sends the validation number or authorization information to the host. block 132.

Figure 12:
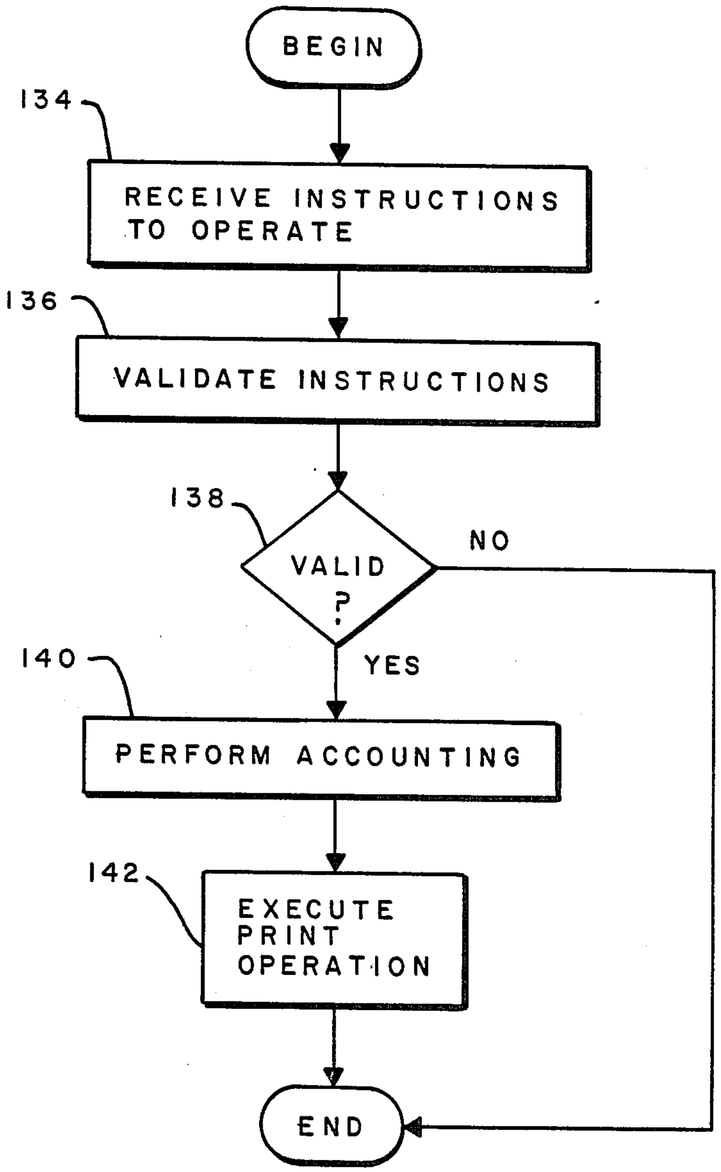
FIG. 12 is a flow chart showing the operation of the mailing system shown in FIG. 8.

Reference is now made to FIG. 12 which is a flow chart of the operation of the system show in FIG. 8. The meter receives an instruction to operate, block 134. The meter thereafter validates the request such as by insuring there is adequate postage available for printing decision, block 136. If the meter does not validate the instruction, block 138, operation is terminated. If on the other hand the meter validates the instruction processing continues. The meter performs the necessary accounting, in the manner previously described, block 140. The meter thereafter generates a signal to cause the printer control logic to operate the printer to print the desired postage or other data, block 142.

Figure 13:
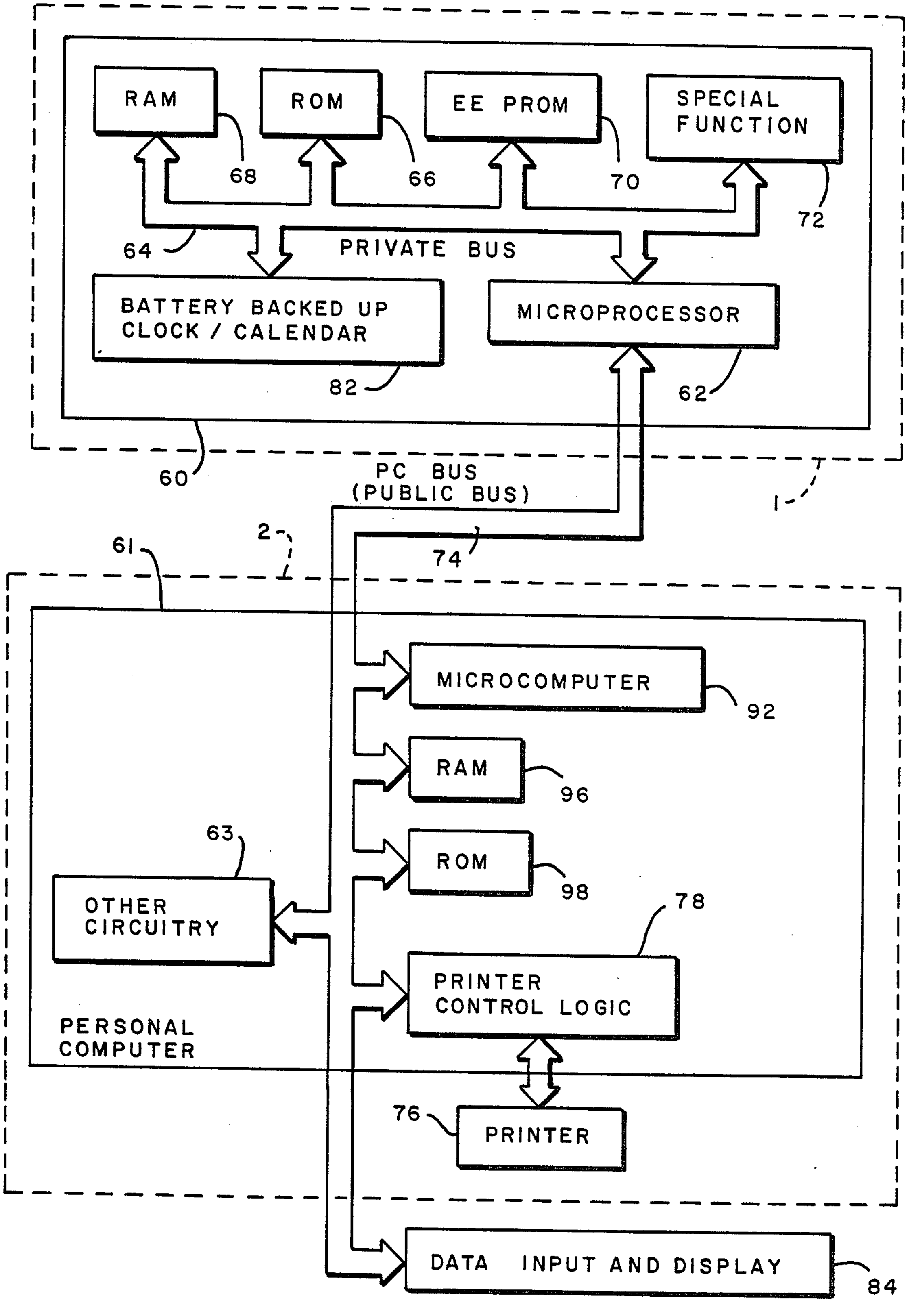
FIG. 13 is a block diagram of an electronic postal mailing system utilizing a removable device providing metering and accounting functions and a personal computer and associated printer functioning as the host.

It should be recognized that many arrangements of the structure shown in FIGS. 8 and 9 are possible. One example, is shown in FIG. 13 which includes a removable device for a personal computer utilized as the meter, with the personal computer 61 and its associated printer 76 constituting the host 2. The meter section or device 60 constitutes in such a case a highly secure "card" or "vault" that handles the funds transfer and accounting as described. As such a device, a personal computer postage meter (PCPM) may have an auxiliary on board processor with its own permanent program memory in its own electrically erasable programmable read only memory as shown in FIG. 9. These memories are not accessible from the outside world. It should be noted that the microcomputer 62 and its associated circuitry can be encapsulated in such a way that any attempt to gain direct access to the devices would destroy the devices and result in the loss of any postage funding or other critical data stored in the memory. Other circuits on the personal computer postage meter can be encapsulated with the host processor such as the nonvolatile memory 102 and the clock and date calendar 82 with its associated back up battery.

The architecture of the personal computer postage meter is be designed to fit within the address structure of the personal computer. The personal computer is thus, able to write data into the personal computer postage meter and the personal computer postage meter is able to pass data back to the personal computer. As noted above various configurations are possible for the personal computer postage meter. In one arrangement the personal computer postage meter contains an interface for the printer and the printer is directly connected to the personal computer postage meter. In the second arrangement the printer is connected to the personal computer through a standard interface port.

For the various system described in connection with FIGS. 1, 8, 9, and 13, it should be noted that the nonvolatile memory 70 can be partitioned into several sections. One section would contain parameters that define the meter that could only be set once in the factory. Any attempt to change the section from the outside of the processor would be prevented because of permanent code stored in the nonvolatile memory 70 or even in the read only memory 66. For example, information can be installed in a memory location in the nonvolatile memory 70 before assembly of the meter and no program instructions included in the read only memory 66 that would allow writing of data to those particular nonvolatile memory locations, although the locations would be readable for operation by the microcomputer 62 Thus no overwriting nor erasure of the data in the location could occur.

A second section of the nonvolatile memory 70 can be field settable only through a secure protocol involving transfer of secure and coded information. This section of the nonvolatile memory 70 can contain, among other information, status registers which would correspond to the amount of postage purchased from the post office or other suitable authority. It can also contain registers with the descending postage value register and an audit trail. The information in this second section would be made secure and fault tolerant both by space diversity and by fault tolerant coding techniques including "Hamming" or other similar code techniques.

The systems may have three distinct basic states of operation. The first state involves "parameter set up", the second state involves "administrative function" and the third state involves "operation".

In parameter set up, system provides instructions about the peripherals on the personal computer, the size of the envelopes, and the time, date and city settings and other similar type information. As noted above the selection of printer (from a supported list of printers) would set up a printer capability table that would allow mapping of bar/half bar data and graphics to any of the supported printers. This information is stored on the personal computer postage meter or in the application software on the system.

The system in its administrative operation provides loading of postage into the meter, and checking as to the status of the meter. Postage can be loaded into the personal computer postage meter by a secure hand shake or alternatively by the use of remote recharging techniques such as is disclosed in U.S. Pat. No. 4,097,923 for A REMOTE POSTAGE METER CHARGING SYSTEM USING AN ADVANCED MICROCOMPUTERIZED POSTAGE METER. If a remote recharging type system is employed, the user would obtain the meter number, status of the ascending and descending registers and like data from the meter via the data input device 84, call the data center for the appropriate code information to be entered into the meter and thereafter load such data into the meter via the data input device 84. Relevant data and prompts to help a user through various sequences of operation can be displayed on the system data display. The system could contain the recharging algorithm as is disclosed in the above noted U.S. Pat. No. 4,097,923, however, the algorithm would be in a secure portion to prevent access.

In the operational mode, the system prints postage and, if desired, addresses and other data on the envelope. Naturally, in the case of the personal computer, the system may also operate to print letters, provide other types of communications and provide typical personal computer functions. The user would transmit, by utilization of software in the system, letter addresses into the personal computer postage meter. The personal computer postage meter processor would thereafter compute necessary information, based on data such as zip code, city and state data, date and provide the encrypted validation number. In systems as described herein where the printer is directly connected to the system postage meter, the printer control logic 78 in response to signals from microcomputer 62 would cause the printer 76 to print the indicia and the encrypted validation number onto the envelope, tape or other medium.

Alternatively, in systems employing personal computers, where the printer is connected to the personal computer, the personal computer postage meter would pass the appropriate information back to the personal computer application software, which would then, in turn, pass it to the printer. The system can, for example, print conventional indicia, augmented with additional encrypted data for positive proof of payment, using the graphics mode on the supported printer.

The advantage of the above PCPM system includes the ability to provide a low cost postage meter system that is fabricated around a conventional unmodified personal computer and personal computer peripherals as well as other capabilities which are evident from or inherent to the particular construction.

It should be recognized that the device 60 which is removable from the meter 1 can be recharged by as noted above the remote recharging techniques for example from the data input and display module 84 or can be physically removed from the meter and carried to a recharging station where it is recharged. Alternatively, the device 60 can be physically taken to the postal authorities where special equipment is employed to recharge the device with additional postage funds or device 60 can be sent to and received from the appropriate postal authorities via the mail. It should further be recognized that the device 60 is not necessarily limited to use with a single meter or a single printer but can be used with a plurality of meters and a plurality of printers depending upon the particular design of the system. For example, it is possible that every department within an organization may have a device 60 while only one meter 1 exists within the organization. Thus, each time postage is to be printed the user brings the department device, inserts it into the meter 1 to thus control postage charges by department. Thus, the device is totally portable.

The above described embodiment can be modified in a variety of ways and those modification would still be within the spirit and scope of Applicants' invention. For example, a telephone with a keypad in combination with a voice responsive system could be typically part of a verifying facility. In this example, a remote decryption device would be dialed up and upon answering could request, by voice, that the serial and validation numbers be keyed in on the telephone keypad. The remote facility would then decrypt the validation number and return the decrypted information to the caller via voice response. Thus, while this invention has been disclosed by a means of a specific, illustrative embodiment, the principals thereof are capable of a wide range of modification by those skilled in the art within the scope of the following claims.

What is claimed is:

1. A value printing system having a first processing means coupled to a printing means and a metering device, said metering device comprising:

a second processing means;

a non-volatile memory means coupled to said second processing means, said non-volatile memory means for storing accounting information located therein and for transferring accounting information to said second processing means;

means, coupled to said second processing means, for encrypting information supplied by said first processing means such that said second processing means accounts for the value to be printed and supplies said first processing means with data giving evidence, to be printed along with the value by said printing means that value has been accounted for; and a portable device, removably coupled to said meter, said portable device supporting said second processing means and said non-volatile memory.

2. A value printing system as defined in claim 1 further including a permanent program storage means and a dynamic data storage means coupled to said second processing means, said permanent program storage means and said dynamic data storage means supported on said device.

3. A value printing system as defined in claim 2 further comprising a private bus means supported on said device and coupling said second processor means and said nonvolatile memory such that said nonvolatile memory means can only be accessed through said second processing means.

4. A value printing system as defined in claim 3 further comprising a permanent program storage means and a dynamic data storage means supported on said device and coupled to said private bus means.

5. A value printing system as defined in claim 3 wherein said first processing means and said second processing means are coupled by a public bus means such that access by said first processing means to said nonvolatile memory means is by way of said public bus means, said second processing means and said private bus means.

6. A value printing system as defined in claim 5 wherein said removable device provides physical and electrical protection for said second processing means, said nonvolatile memory means, said permanent program storage means and said dynamic data storage means, which are supported on said device.

7. A value printing system as defined in claim 1 further comprising a second nonvolatile memory means, said s ond nonvolatile memory means coupled to said second processing means.

8. A value printing system as defined in claim 7 further comprising a clock/calendar means coupled to said second processing means.

9. A value printing system as defined in claim 1 further comprising a permanent program storage means coupled to said first processing means, said permanent program storage means containing operating programs for a plurality of different types of printing means, and said printing means removably coupled to said first processing means.

10. A value printing system as defined in claim 9 further comprising a clock/calendar means coupled to said second processing means.

11. A value printing system as defined in claim 5 wherein said public bus means is a local area network.

12. A value printing system as defined in claim 5 wherein said public bus means is a telephone network.

13. A value printing system as defined in claim 3 further comprising a second permanent program storage means coupled to said first processing means and wherein portions of the operating program for said second processing means is stored in said first and said second permanent program storage means.

14. In a value printing system, the system including a printing means, the value printing system including a portable metering device, the portable metering device comprising, a processing means input means coupled to said processing means for inputting information, a nonvolatile memory means, private bus means coupling said nonvolatile memory menas to said processing means, said nonvolatile memory means for storing accounting information located therein and for transferring accounting information to the processing means, and means coupled to the processing means for encrypting information to be printed by said printing means, in which the processing means accounts for the value to be printed and supplies the printing means with data giving evidence that value has been accounted for and which said printing means will print along with the value.

15. A value printing system as defined in claim 14 further including a device removably coupled to said meter, said processing means and said nonvolatile memory means supported on said device.

16. A value printing system as defined in claim 15 further including a permanent program storage means and a dynamic data storage means coupled to said processing means, said permanent program storage means and said dynamic data storage means supported on said device.

17. A value printing system as defined in claim 16 further comprising a private bus means supported on said device and coupling said processing means and said nonvolatile memory such that said nonvolatile memory means can only be accessed through said processing means.

18. A value printing system as defined in claim 17 further comprising a permanent program storage means and a dynamic data storage means supported on said device and coupled to said private bus means.

19. A value printing system as defined in claim 17 wherein said processing means and said printer are coupled by a public bus means such that access to said nonvolatile memory means is by way of said public bus means, said processing means and said private bus means.

20. A value printing system as defined in claim 19 wherein said removable device provides physical and electrical protection for said processing means, said nonvolatile memory means, said permanent program storage means and said dynamic data storage means, which are supported on said device.

21. A value printing system as defined in claim 15 further comprising a clock/calendar means coupled to said public bus means.

22. A value printing system as defined in claim 19 wherein said public bus means is a local area network.

23. A value printing system as defined in claim 19 wherein said public bus means is a telephone network.

24. A value printing system as defined in claim 19 wherein said printing means is removably coupled to said public bus means.

25. A value printing system as defined in claim 1 wherein the accounting information is stored in said nonvolatile memory employing a fault tolerant data storage technique.

26. A value printing system as defined in claim 25 wherein the fault tolerant data storage techniques comprising space diversity storage.

27. A value printing system as defined in claim 26 wherein the fault tolerant data storage technique further comprises an error correcting data storage technique.

* * * * *